United States Patent
Minton

Patent Number: 5,157,869
Date of Patent: Oct. 27, 1992

[54] COMPOUND SEPARABLE PLANT POT

[76] Inventor: James D. Minton, N. 1523 Lacey, Spokane, Wash. 99207

[21] Appl. No.: 619,481

[22] Filed: Nov. 29, 1990

[51] Int. Cl.$^5$ ............................................. A01G 23/02
[52] U.S. Cl. .......................................... 47/73; 47/75; 220/4.21
[58] Field of Search .............................. 47/73, 75, 71; 220/4.21, 4.24, 4.09

[56] References Cited

U.S. PATENT DOCUMENTS

| | | | |
|---|---|---|---|
| 473,836 | 4/1892 | Goodacre | 47/73 |
| 1,500,917 | 7/1924 | Bell | 220/4.09 |
| 1,852,281 | 4/1932 | Bell | 220/4.09 |
| 3,092,277 | 6/1963 | Brim | 220/4.24 |
| 3,952,903 | 4/1976 | Sanders | 220/4.24 |
| 3,991,516 | 11/1976 | Cicero | 47/73 |
| 4,132,457 | 1/1979 | Parrish | 220/4.24 |
| 4,216,622 | 8/1980 | Hollenbach | 47/73 |
| 4,325,202 | 4/1982 | Liard | 47/73 |

*Primary Examiner*—Henry E. Raduazo
*Attorney, Agent, or Firm*—Keith S. Bergman

[57] ABSTRACT

A peripherally defined, truncated conic plant pot provides two releasably interconnected portions that are maintained in interconnected relationship by a cup-like bottom element. The interconnected pot portions each define substantially diametrical halves of the pot and are joined by an overlapping seam which has complementary nubbin and indentation structures to aid releasable fastening. The adjacent surfaces of the pot and fastening cup have complementary nubbin and indentation fasteners communicating therebetween to aid releasable fastening and positional maintenance of these elements. The pot structure is particularly adapted for formation by injection molding from plastic materials.

1 Claim, 1 Drawing Sheet

U.S. Patent     Oct. 27, 1992     5,157,869
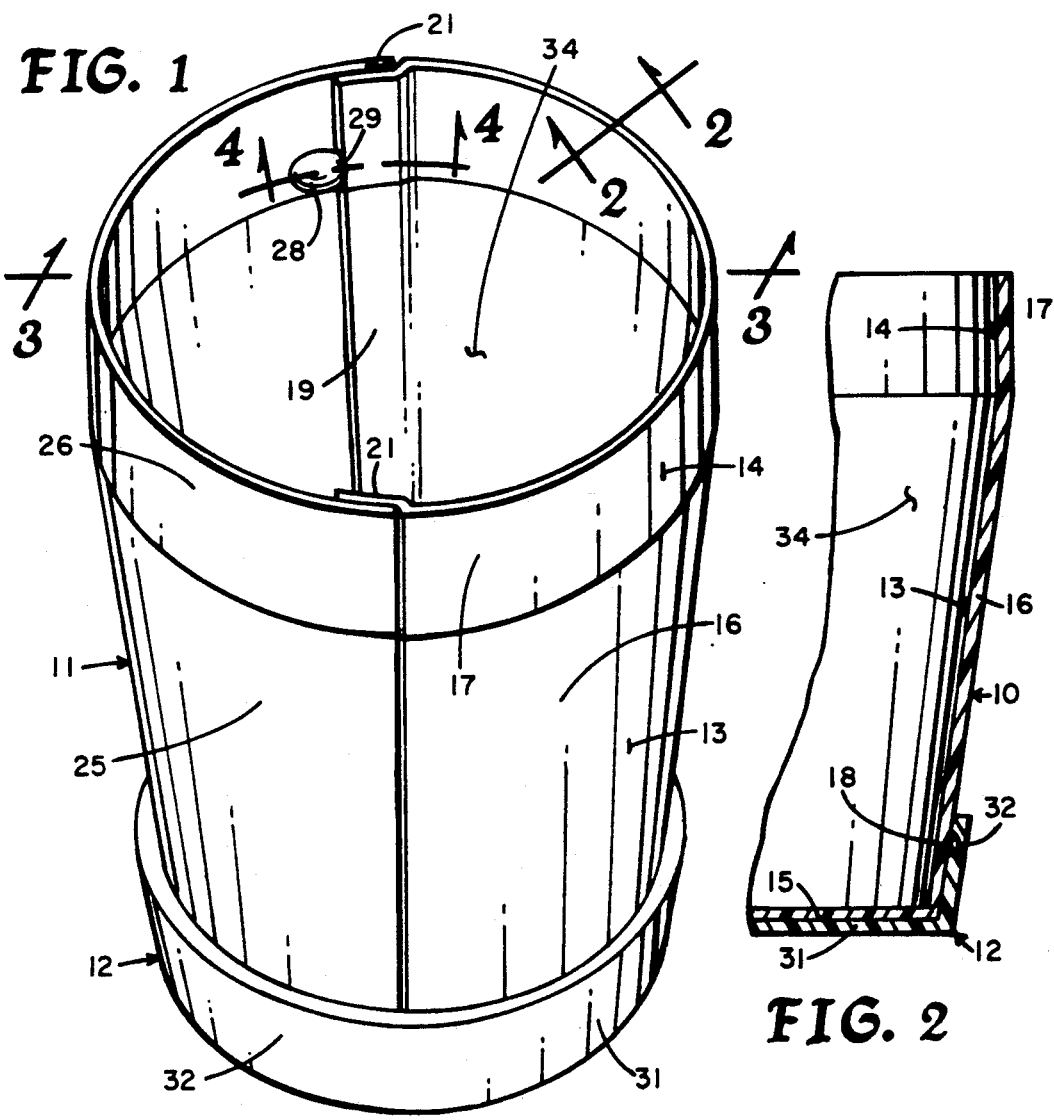
FIG. 1
FIG. 2
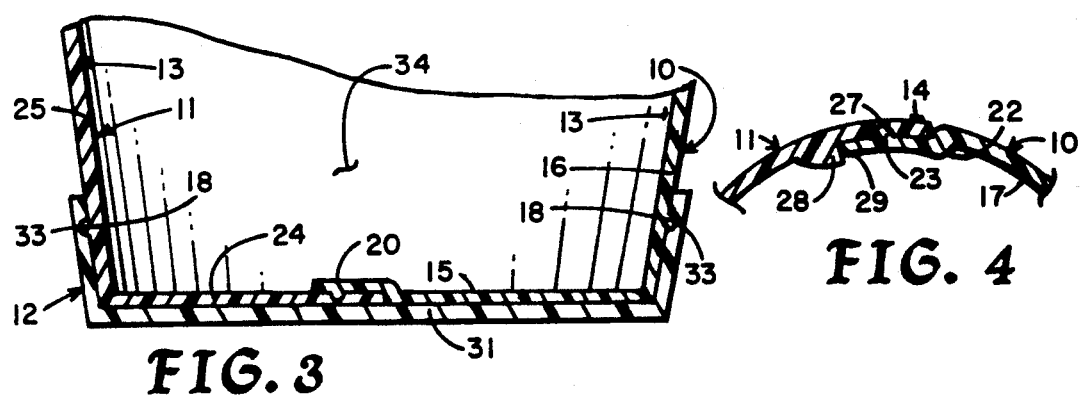
FIG. 3
FIG. 4

COMPOUND SEPARABLE PLANT POT

BACKGROUND OF THE INVENTION

Related Applications

There are no applications related hereto heretofore filed in this or any foreign country.

1. Field of Invention

My invention relates generally to plant pots and more particularly to a compound pot having two portions maintained in releasable interconnection by a bottom cup.

2. Background and Description of Prior Art

Peripherally defined pots of one sort or another have long been used for the containment of soil or other media for the growing of plants therein. Such pots commonly have been associated with the containment of flowering plants and by reason thereof, have commonly come to be known in the vernacular as "flower pots". That term "pot" as used herein is used with such meaning, but it is to be understood that it includes pots for all types of plants, whether they be of a flowering nature or not.

Known plant pots have taken many and various forms and configurations for particular specialized purposes of either a utilitarian or ornamental nature. All such pots, however, share the common purpose of containment of a sufficient quantity of some type of medium which, with appropriate care, will sustain a plant biologically established therein. Because a plant is a living and growing organism, its conditions, nature and circumstances often change and the containing pot that may at one time be appropriate for a particular plant at a different time well may be inappropriate for it. It is therefore sometimes necessary to remove a plant from a pot in which it is growing. The chief reason for this removal requirement is the growth of the plant itself, which in the case of ornamental plants may required repotting in a larger pot, or in the case of various commercial plants may require transference to some other type of plant sustaining medium such as the earth.

The removal of a plant from a pot in which it has become established in a growth media often presents problems. Most plants that are cultured in pots have complex root structure extending into the growth medium in a pot and generally, this root structure is fairly extensive in comparison to the limited volume of an average pot and is of quite delicate nature. Most pot raised plants are fairly sensitive to disturbance of their root structure. If that root structure be severely disturbed, the health of a plant and its growth cycle may be materially adversely effected, and the effect may even cause plant death in severe cases in with plants of unusually delicate nature.

This problem has been recognized in the past, but has not been dealt with to nearly the same degree of sophistication as has been involved with the development of modern horticulture in general. Most commonly in the past, if the problem was not ignored, the common methods of dealing with it was to break a pot structure, if possible, to attempt to maintain the planting media in somewhat of a unified coherent mass so as not to damage fine plant roots anymore than necessary in the transplanting process, or to use pots which had truncated conical shape from which the volume of contained planting media might possibly be lifted upwardly and removed in somewhat of a coherent mass, without causing too much root damage. Neither method has been very satisfactory as the first is destructive of the pot which tends to make the process not particularly economically feasible. The second method has not proven too effective because of the difficulty in removing the plant growing media from a pot, and even if it can be removed, the difficulty in maintaining it in some sort of a coherent mass so that extensive root damage is not caused during the process.

In the more recent development of plant pots, various permeable and disintegratable materials have been used for the pot structure, such as pressed peat moss, fibrous fabric mats, agglomerated frangible plastic materials, and the like which may either disintegrate by the time a pant requires repotting or else may allow some of the plant roots to penetrate the container and pass therefrom without pot removal. This type of container has been used largely commercially for the containment of small plants or seedlings which commonly are transplanted within a relatively short period after initial establishment in a pot, as such pots do not provide any effective permanent containment as commonly desired for house plants. Such permeable type pots generally have not become too popular in commerce because they have been fairly expensive, they are expendable and they in general disrupt the normal biological functioning of a plant by providing at least a partial barrier to its root development even though they are somewhat penetratable. The instant invention is distinguishable from this type of pot in providing a solid peripherally defined pot that has separable parts and is not intended for either time orientated disintegration or invasion by plant root systems.

Though most known plant pots have been of a unitary simple structure, compound type pots having relatively movable parts or take-apart features have become known, though not nearly so well as their simple counterparts. The take-apart pots of the prior art generally have provided a pot structure, or at least the vertical elements of such a structure, with relatively movable portions, usually two in number and each of somewhat the same size. These movable parts generally have been interconnected at or near their joining edges by some type of mechanical structure interconnected to both pot parts, usually a hinge. My invention differs from this art by providing two pot portions that are not mechanically joined but interconnect by an overlapping seam defined along their entire adjacent edges, which generally is not possible with a hingeably interconnected structure. My pot parts are removably interconnected in their overlapping areas by nubbin and indentation type connectors depending for their function on the configuration of the pot structure and the resilient deformability of the material from which the pot is constructed.

My pot additionally provides a cup-like dish that fits about the bottom portion of the pot when in assembled mode to releasably but quite securely maintain that assembled mode. This fastening cup structure cooperates with the adjacent surface of the pot to provide additional complementary nubbin and indentation and releasable fastening of take-part type pots does not appear to be known in the prior plant pot art.

Another type of compound pot structure that has heretofore become known provides a pot of a compound nature that has a plurality of parts that may allow the expansion of the pot during use, so that when expanded additional medium may be added to the pot to effectively accomplish pot enlargement with a minimal disturbance to plant roots. This type of pot generally has a plurality of relatively movable periphery forming elements, and at least more than two such elements. The elements normally are not fastenably interconnected by reason of their configuration so that they can be separated from each other and the structure is necessarily of a quite complex nature and high manufacturing cost, to distinguish that type of pot structure from my pot.

My invention lies not in any one of these features per se, but rather in the synergistic combination of all of the structures of my pot that necessarily give rise to the functions flowing therefrom, as herein specified and claimed.

SUMMARY OF THE INVENTION

My invention in general provides a peripherally defined, truncated conic plant pot, with or without upper rim, formed by two similar releasably interconnected halves. The two halves are joined by an inwardly extending overlapping seam having complimentary nubbin and indentation fasteners defined between its adjacent surfaces to aid releasable interconnection. The pot is maintained in an erected mode by a cup-like dish that extends over the bottom and lower side portion of the pot.

In providing such a pot:

It is a principal object to create a peripherally defined pot that is formed with two similar separable halves that may be disconnected and separated to aid access to planting medium contained in the pot, especially as required for repotting or transplanting of plants.

A further object is to provide such a pot with an overlapping seam extending completely along the adjoining edges of the interconnected pot halves to provide a secure interconnection, aid alignment of parts and aid releasable attachment of the elements.

A still further object is to provide such a pot that has a cup-like dish that fits over the bottom portion and extends a spaced distance upwardly on the pot sides to aid in maintaining the assembled mode of the pot.

A still further object is to provide such a pot that is adapted to formation by molding from resinous or polymeric plastic materials.

A still further object of my invention is to provide such a pot that is of new nd novel design, of rugged and durable nature, of simple and economic nature and one otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment of its known best mode of sue being specified and illustrated in the accompanying drawings, as is required.

BRIEF DESCRIPTION OF DRAWINGS

In the accompanying drawings which form a part hereof and wherein like numbers of reference refer to similar parts throughout:

FIG. 1 is an isometric view of my pot in assembled mode showing its various parts, their configuration and relationship.

FIG. 2 is a partial vertical cross-section through the peripheral area of the side of the pot of FIG. 1, taken on the line 2—2 thereon in the direction indicated by the arrows.

FIG. 3 is a diametrical cross-sectional view of the pot of FIG. 1, taken on the line 3—3 thereon in the direction indicated by the arrows.

FIG. 4 is a partial horizontal cross-sectional view of the upper portion of the overlapping side seam and alignment lug of the pot structure of FIG. 1, taken on the line 4—4 thereon in the direction indicated by the arrows.

DESCRIPTION OF THE PREFERRED EMBODIMENT

My invention generally provides side 10 with internal overlapping seam structure that releasably interconnects with side 11 to form a releasably joined pot structure that is maintained in assembled mode by lower external fastening cup 12 extending about the lower portion of the pot.

In the form illustrated, my pot takes the configuration of a surface of revolution defining a lower truncated conic portion 13, with an upper cylindrical rim structure 14. Though this shape is popular and commonly preferred in plant pots, it should be understood that configuration may be varied, not only in size, but also in the nature of the element forming the lower pot portion and in the nature of the rim, if any, forming the upper portion. The pot also may be formed as an asymmetrical structure rather than a surface of revolution and in fact, its vertical side walls need not even constitute a ruled surface. These variations remain within the ambit and scope of my pot structure.

Side 10 provides a member which defines substantially a diametrical half of my pot, comprising flat semi-circular bottom 15 structurally joining upwardly extending side wall 16 terminating in rim 17 in its upper portion. Preferably both the interior and exterior surfaces of the side element are smooth and have simple transitional portions between elements of differing geometric configuration. The elements of the side are of substantially similar thickness. The uppermost edge of rim 17 may define an enlarged edge portion if desired to create a stronger, more rigid and durable rim, but with most modern plastic materials this is not required as a structural feature.

The lower external surface of side 16 defines a plurality of outwardly extending nubbins 18 to cooperate with complementary indentations defined in the inner source of fastening cup 12 to aid releasable interconnection between these elements. The nubbins 18 preferably take the form of a plurality of individual spaced hemi-spherical protuberances, as illustrated, but if desired, they may form a continuous annular ridge about the lower peripheral portion of the pot to serve the same purpose. Commonly, however, with physical properties of ordinary plastic materials, the continuous annular ridge type fastening means is too difficult for convenient establishment and removal of pot elements, especially if there be a reasonably good fit between the sides of my pot and the fastening cup when those elements be in fastened mode.

The edges of bottom 15 and side 16 structurally carry fastening flanges 19 extending from the side element and fastening flange 20 extending from the bottom element. The offset element 22 interconnecting the pot structure with the fastening flanges extends radially inwardly and is so sized as to define a radially outwardly opening groove 21 having a depth approximating the thickness of the adjacent pot side so that adjacent pot side fits within the groove to present a smooth outer surface for my pot when assembled. The internal edges of the flange structure preferably are rounded to prevent cracking and chipping commonly associated with sharp edges formed by plastic materials.

The radially outwardly facing surfaces of flanges 19, 20 define a plurality of spaced nubbins 23 to interfit in complementary indentations defined in the adjacent inner surface of side 1 to aid in releasably fastening the two side elements together and also to aid the positional maintenance of the assembled mode of the pot. The number and spacing of these fastening elements is not critical and in fact, the nubbins may be merged int a continuous ridge extending completely about the medial portion of the two side flanges 19 and bottom flange 20, but again such continuous ridges may provide too secure an interconnection of the elements that makes them difficult to fasten and unfasten. If a water-tight pot is desired gaskets, serrations or similar structures (not shown) may be defined on the radially outer surface of the fastening flanges to mechanically join complementary structures defined on the inner surface of the adjacent portions of side 11 and bottom 24. Though this structure is not illustrated, its nature is known in the interconnection of plastic surfaces and is within the ambit and scope of my invention.

Side 11 provides a structure that is the complementary or mirror image of side 10, except for the fastening flanges. Side 11 is defined by semi-circular bottom 24 interconnecting upwardly extending cylindrical side 25 which in turn in its upper portions defines rim 26. All of this structure is formed with similar configuration to counter structure in side 10 and with similar thickness and from similar material. The inner surfaces of the sides and bottom, inwardly adjacent their edges, define a plurality of spaced indentations 27, arrayed to receive fastening nubbins 23 defined on the external surfaces of fastening flanges 19, 20 of side 10. The form of indentations shown is optional and if other forms of protuberances, such as a continuous ridge, be used on the fastening flanges, the indentations are shaped and arrayed in a complementary fashion.

The inner surface of bottom 24 and side 25 define a plurality of spaced positioning lugs 28 which project radially inwardly from the inner surface of those elements and present a radially inwardly extending surface 29. The surfaces 29 are spaced inwardly adjacent the edge of cylindrical sides 25 and bottom 24 a distance such that when the adjacent edge of fastening flanges 19, 20 of side 10 are in assembled mode, those surfaces will be immediately adjacent surfaces 29. The lugs 28 serve to prevent the two sides 10 and 11 from moving toward each other past an assembled position. Preferably the positioning lugs are formed as a unitary part of side and bottom elements. The number of positioning of such lugs is not critical, but commonly one lug will be provided spacedly below the top of the rim of each side and in the medial portion of the bottom structure.

Fastening cup 12 provides a dish-like structure having flat circular bottom 31 structurally interconnected with upstanding angulating side 31 extending spacedly thereabove. These elements define a truncated conic structure having an internal surface that is substantially of the same configuration as the adjacent portion of the external surface of the assembled pot. The height of upstanding sides 2 above bottom element 31 is not critical, but preferably is approximately 0.75 (1.9 centimeters) inch to allow appropriate support and convenient placement of the members.

The internal surface of fastening cup side 32 defines spaced indentations 33 configured and arrayed to fastenably receive nubbins 23 defined on the lower outer surface of sides 10 and 11. The configuration and array of these indentations is complementary to the array of associated fastening nubbins, so that the fasteners maybe cooperatively interconnected to serve their intended purpose.

The several elements of my pot are well adapted to formation by injection molding from resinous or polymeric plastic materials, and preferably are formed in such fashion from such materials. The configuration of the pot illustrated is that most commonly desired, though as indicated, other configurations embodying the same essentials remain within the ambit and scope of my invention, whether they be symmetrical or asymmetrical and whether they be ruled surfaces or not.

Having thusly described the structure of my invention, its use may be understood.

Firstly, a pot structure, comprising two separate sides 10, 11 and a fastening cup 12, is formed according to the foregoing specification with appropriately desired size and configuration. To assemble these elements for use, the two sides are joined by manually moving their edges together, so that the side and bottom edges of side 11 extend within groove 21 defined by the fastening flanges 19, 20 of side 10. In moving these elements together, it is to be noted that when the elements are in appropriate assembled position, the further inward motion of side 10 toward side 11 will be stopped by contact by positioning lugs 28 with the adjacent edges of side 10. The movement of the sides into this fastening position relative to each other will involve some slight deformation of the side elements, and especially of their adjacent overlapping portions, to allow nubbins on one element to become engaged in the complementary indentations in the other element. With most plastic materials of ordinary physical characteristics this deformation is readily accomplished by manual manipulation and since such structure are somewhat elastically resilient, they readily move back to their original configuration after fastenable engagement.

When the two pot sides are thusly associated, they will be somewhat fastenably engaged with each other by reasons of the association of the nubbin and indentation fasteners and the particular configuration of the elements. This assembled mode of the two pot sides is further enhanced by the fastening cup extending about the bottom portion of the two assembled sides. The fastening cup is placed by moving the assembled pot structure downwardly into the fastening cup by appropriate manual manipulation. Again, this assemblage will require some elastic deformation of the elements, principally the upper portion of the fastening cup side 32, to allow the downward passage of fastening nubbins 23 into engagement in indentations 33 defined in the inner surface of the fastening cup. When positioned, the fastening cup serves as an additional means for maintenance of the assembled mode of the pot.

Once the pot is assembled as aforesaid, it is ready for use in the normal fashion of a plant pot. Planting media may be established within chamber 34 defined by the pot, and one or more plants established in traditional fashion in such media for their ordinary horticultural maintenance. With the passage of time, when it becomes necessary to remove plant structure from my pot for replanting, transplanting or other purposes, this may be readily accomplished by reversing the process heretofore described for establishing the assembled mode of my pot.

Firstly, fastening cup 12 is removed from the pot structure by appropriate manual manipulation. Should the fastening cup become adhesively engaged with the pot, removal may be aided by insertion of some type of a sharp edged tool, such as a knife, screw driver or the like, between the pot side elements and the fastening cup at the upper junction therebetween. Such a total will aid resilient deformation of the upper portion of the fastening cup to accomplish release, if this cannot be done by other manipulations. After the fastening cup is removed, the two side structures are slightly deformed manually, to move either the fastening flange structure radially inwardly or the adjacent side portion of side 11 radially outwardly, to cause these elements to release their fastenable engagement. After release, one side element may be removed, commonly while the plant growing medium and contained plant root structure is held in the other side portion of the pot for support. At this point, substantially one-half of the potting medium will be exposed, and the entirety of that material may be readily removed from the other half of the pot supporting it by ordinary manual manipulation. The pot then may be reassembled in the fashion previously described from further use and the plant and associated growth medium disposed for further use.

From the structure described, it is to be particularly noted that when one pot side is removed from planting medium contained in the pot, approximately half of that medium will be uncovered, but at the same time the other half will still be supported within the other sides of the pot. Normally when most plants are unpotted, their root structure will have developed sufficiently in the planting medium to provide some cohesiveness to this material, and it will normally manipulation and gravity. This provides substantial convenience in unpotting plants, and tends not to unduly disturb any finer root structure during the repotting process.

It is further to be noted that when planting medium is packed in the internal chamber of my pot, it will tend to create radially expansive forces tending to force the sides of the pot radially outwardly. Such forces tend to further enhance the fastening of the pot sides to each other by reason of the particular configuration of the pot and its fastening structure, whereas with many other pot structures such forces tend to disconnect and force pot portions away from each other.

It is further to be noted that the overlapping seam structure provides a substantial are of adjacency between the interconnected pot sides, whereas with many compound pot structures heretofore known, seams between interconnected parts have either not been completely closed or if closed, have had a relatively small contact area so that the roots of plants may readily force themselves through the seam area and between adjacent surfaces to tend to disrupt the fastenable communication of the various pot elements.

The foregoing description of my invention is necessarily of a detailed nature so that a specific embodiment of it might be set forth as required, but it is to be understood that various modifications of detail, rearrangement and multiplication of parts might be resorted without departing from its spirit, essence or scope.

Having thusly described my invention, what I desire to protect by Letters Patent, and what I claim is:

1. A separable compound plant pot, having releasably interconnected side elements and bottom structure, defining an internal chamber for containment of plant sustaining medium, comprising, in combination:

a first side element, defining a first portion of a plant pot periphery, having a flat bottom, a lower portion and an upstanding side surface, said first side element having side edges with fastening flanges extending from the side edges each said fastening flange defining a radially outwardly opening groove along each side edge to receive an adjacent portion of a second side element;

a second side element, defining the second remaining portion of the plant pot periphery, having a flat bottom, a lower portion and an upstanding side surface with side edges to interfit in the grooves defined by the fastening flanges of the first side element;

a fastening cup having a flat bottom and upstanding sides defining a chamber to fit immediately outwardly adjacent the lower portions of the assembled pot side elements to maintain the pot side elements in their assembled relationship;

complementary nubbin and indentation fastening means defined by adjacent overlapping surfaces of the side elements of the pot to releasably fasten said overlapping surfaces to each other, and nubbin and indentation fastening means defined between the adjacent surfaces of the pot side elements and the upstanding sides of the fastening cup to releasably fasten the pot side elements within the fastening cup; and plural spaced positioning lugs, extending radially inwardly into the chamber defined by the plant pot, spacedly adjacent the side edges of the second side element to prevent the first side element from extending beyond a fastenable position relative to the second side element.

* * * * *